United States Patent
Hu et al.

(10) Patent No.: US 10,469,388 B2
(45) Date of Patent: Nov. 5, 2019

(54) FLOW ENTRY DELIVERING METHOD, FLOW ENTRY STORAGE METHOD, RELATED APPARATUS, AND RELATED SYSTEM

(71) Applicant: HUAWEI TECHNOLOGIES CO., LTD., Shenzhen, Guangdong (CN)

(72) Inventors: Shihui Hu, Beijing (CN); Jie Hou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/837,811

(22) Filed: Dec. 11, 2017

(65) Prior Publication Data

US 2018/0102974 A1 Apr. 12, 2018

Related U.S. Application Data

(63) Continuation of application No. PCT/CN2016/085130, filed on Jun. 7, 2016.

(30) Foreign Application Priority Data

Jun. 12, 2015 (CN) .......................... 2015 1 0323801

(51) Int. Cl.
  *H04L 12/801* (2013.01)
  *H04L 12/715* (2013.01)
  *H04L 12/751* (2013.01)

(52) U.S. Cl.
  CPC .............. *H04L 47/12* (2013.01); *H04L 45/02* (2013.01); *H04L 45/64* (2013.01)

(58) Field of Classification Search
  CPC ......... H04L 47/12; H04L 45/02; H04L 45/64; H04L 12/48; H04L 12/56; H04L 12/891
  See application file for complete search history.

(56) References Cited

U.S. PATENT DOCUMENTS

| 9,548,920 | B2 * | 1/2017 | Narasimha .............. H04L 45/38 |
| 2012/0155467 | A1 | 6/2012 | Appenzeller |

(Continued)

FOREIGN PATENT DOCUMENTS

| CN | 101808159 A | 8/2010 |
| CN | 102289453 A | 12/2011 |

(Continued)

OTHER PUBLICATIONS

Extended European Search Report, dated Apr. 30, 2018, in European Application No. 16806815.3 (19 pages).

(Continued)

Primary Examiner — Mohamed A Kamara
(74) Attorney, Agent, or Firm — Conley Rose, P.C.

(57) ABSTRACT

A flow entry delivering method includes: a controller obtains a device identifier of a network device and at least one flow entry used to perform a function on the network device. The controller obtains storage information of the network device according to the device identifier, and the storage information includes free space in storage space of the network device that is used to store a flow entry. The controller compares the free space with a total capacity of the at least one flow entry and determines whether the network device has sufficient free storage space to store the at least one flow entry. When the network device has the storage space greater than or equal to the capacity of the flow entry, the controller delivers the at least one flow entry, or when the network device has no storage space to store the flow entry, the controller does not deliver it.

15 Claims, 9 Drawing Sheets

(56) References Cited

U.S. PATENT DOCUMENTS

| | | | |
|---|---|---|---|
| 2013/0080657 A1 | 3/2013 | Yamaguchi et al. | |
| 2013/0170503 A1* | 7/2013 | Ooishi | H04L 45/38 370/401 |
| 2014/0108632 A1 | 4/2014 | Narasimha et al. | |
| 2016/0218957 A1 | 7/2016 | Liang et al. | |
| 2018/0077032 A1* | 3/2018 | Park | H04L 41/5067 |

FOREIGN PATENT DOCUMENTS

| | | |
|---|---|---|
| CN | 102724112 A | 10/2012 |
| CN | 102893577 A | 1/2013 |
| CN | 103168453 A | 6/2013 |
| CN | 104077191 A | 10/2014 |
| CN | 104219150 A | 12/2014 |
| CN | 104426815 A | 3/2015 |
| EP | 2858329 A1 | 4/2015 |
| EP | 3101853 | 12/2016 |

OTHER PUBLICATIONS

International Search Report dated Aug. 29, 2016 in corresponding International Patent Application No. PCT/CN2016/085130.
International Search Report dated Aug. 8, 2016 in corresponding International Patent Application No. PCT/CN2016/085130.
Office Action, dated Mar. 4, 2019, in Chinese Application No. 201510323801.6 (13 pages).

* cited by examiner

FLOW ENTRY DELIVERING METHOD, FLOW ENTRY STORAGE METHOD, RELATED APPARATUS, AND RELATED SYSTEM

CROSS-REFERENCE TO RELATED APPLICATIONS

This application is a continuation of International Application No. PCT/CN2016/085130, filed on Jun. 7, 2016, which claims priority to Chinese Patent Application No. 201510323801.6, filed on Jun. 12, 2015. The disclosures of the aforementioned applications are hereby incorporated by reference in their entireties.

TECHNICAL FIELD

The present invention relates to the communications field, and in particular, to a flow entry delivering method, a flow entry storage method, a related apparatus, and a related system.

BACKGROUND

A controller delivers a flow entry to a network device, so that the network device can perform a corresponding function such as forwarding or discarding a packet according to the obtained flow entry. To enable a network device to perform a function, a controller needs to deliver one or more flow entries related to the function to the network device. The network device usually specifies dedicated storage space to specially store the flow entries delivered by the controller.

In the prior art, when a controller delivers a flow entry to a network device, the controller does not consider a storage status of storage space of the network device that is used to store a flow entry. When storage space of a network device that is used to store a flow entry is insufficient, a controller may still deliver a flow entry to the network device to enable the network device to perform a function. Because the network device has insufficient storage space in this case, the network device can store no flow entry or only a part of a received flow entry. As a result, the network device cannot perform the function, and the controller unsuccessfully delivers the flow entry.

How to improve a success rate of delivering a flow entry by a controller is a technical problem that needs to be resolved.

SUMMARY

To resolve the foregoing technical problem, embodiments of the present invention provide a flow entry delivering method, a flow entry storage method, a related apparatus, and a related system, so that a controller delivers no flow entry to a network device when free space is less than a total capacity, to improve a success rate of delivering a flow entry by the controller.

According to a first aspect, an embodiment of the present invention provides a flow entry delivering method. The method includes:

obtaining, by a controller, a device identifier of a network device and at least one flow entry that is used to perform a function on the network device;

obtaining, by the controller, storage information of the network device according to the device identifier, where the storage information includes free space in storage space of the network device that is used to store a flow entry;

comparing, by the controller, the free space with a total capacity of the at least one flow entry; and if the free space is greater than or equal to the total capacity, delivering, by the controller, the at least one flow entry to the network device according to the device identifier; or if the free space is less than the total capacity, skipping, by the controller, delivering the at least one flow entry to the network device.

In a first possible implementation of the first aspect, the free space in the storage space that is used to store a flow entry specifically includes reserved free space and non-reserved free space, the at least one flow entry further includes a corresponding user identifier, and the method further includes:

determining, by the controller according to the user identifier, whether the storage space includes reserved subspace corresponding to the user identifier, where the reserved subspace is part or all of the reserved free space; and if the reserved subspace is included, the comparing, by the controller, the free space with a total capacity of the at least one flow entry includes:

comparing, by the controller, the reserved subspace with the total capacity of the at least one flow entry; and if the reserved subspace is greater than or equal to the total capacity, delivering, by the controller, the at least one flow entry to the network device according to the device identifier; or if the reserved subspace is less than the total capacity, comparing, by the controller, the non-reserved free space with the total capacity; and if the non-reserved free space is greater than or equal to the total capacity, delivering, by the controller, the at least one flow entry to the network device according to the device identifier; or if the non-reserved free space is less than the total capacity, skipping, by the controller, delivering the at least one flow entry to the network device.

With reference to the first possible implementation of the first aspect, in a second possible implementation, the determining, by the controller according to the user identifier, whether the storage space includes reserved subspace corresponding to the user identifier further includes:

if the reserved subspace is not included, comparing, by the controller, the non-reserved free space with the total capacity; and if the non-reserved free space is greater than or equal to the total capacity, delivering, by the controller, the at least one flow entry to the network device according to the device identifier; or if the non-reserved free space is less than the total capacity, skipping, by the controller, delivering the at least one flow entry to the network device.

With reference to the first aspect or the first or the second possible implementation of the first aspect, in a third possible implementation, the obtaining, by the controller, storage information of the network device according to the device identifier includes:

sending, by the controller, a request message to the network device according to the device identifier, where the request message is used to request to obtain the storage information of the network device;

receiving, by the controller, a reply message with which the network device replies according to the request message, where the reply message is used to notify the controller of the storage information of the network device; and obtaining, by the controller, the storage information of the network device from the reply message.

With reference to the third possible implementation of the first aspect, in a fourth possible implementation, the request message is an extended multipart request message of the OpenFlow protocol, the extended multipart request message includes a type field and a request body field, the type field carries a type value indicating the storage information, and the request body field is empty or carries the device identifier; and correspondingly, the reply message is an extended multipart reply message of the OpenFlow protocol, the multipart reply message includes the type field and a reply body field, and the reply body field carries the storage information of the network device.

With reference to the first aspect or the first, the second, the third, or the fourth possible implementation of the first aspect, in a fifth possible implementation, the method further includes:

when the controller delivers the at least one flow entry to the network device, or receives a flow entry deletion notification sent by the network device, correspondingly updating, by the controller, the storage information, where the flow entry deletion notification includes a capacity of a flow entry deleted by the network device, and a location at which the deleted flow entry is stored in the storage space before being deleted.

According to a second aspect, an embodiment of the present invention provides a flow entry delivering apparatus. The flow entry delivering apparatus includes:

an obtaining unit, configured to obtain a device identifier of a network device and at least one flow entry that is used to perform a function on the network device;

a search unit, configured to obtain storage information of the network device according to the device identifier, where the storage information includes free space in storage space of the network device that is used to store a flow entry; and a comparison unit, configured to: compare the free space with a total capacity of the at least one flow entry; and if the free space is greater than or equal to the total capacity, trigger a sending unit to deliver the at least one flow entry to the network device according to the device identifier; or if the free space is less than the total capacity, skip triggering a sending unit to deliver the at least one flow entry to the network device.

In a first possible implementation of the second aspect, the free space in the storage space that is used to store a flow entry specifically includes reserved free space and non-reserved free space, the at least one flow entry further includes a corresponding user identifier, and the apparatus further includes:

a determining unit, configured to: determine, according to the user identifier, whether the storage space includes reserved subspace corresponding to the user identifier, where the reserved subspace is part or all of the reserved free space; and if the reserved subspace is included, trigger a first comparison subunit included in the comparison unit, where the first comparison subunit is configured to: compare the reserved subspace with the total capacity of the at least one flow entry; and if the reserved subspace is greater than or equal to the total capacity, trigger the sending unit to deliver the at least one flow entry to the network device according to the device identifier; or if the reserved subspace is less than the total capacity, trigger a second comparison subunit included in the comparison unit, where the second comparison subunit is configured to: compare the non-reserved free space with the total capacity; and if the non-reserved free space is greater than or equal to the total capacity, trigger the sending unit to deliver the at least one flow entry to the network device according to the device identifier; or if the non-reserved free space is less than the total capacity, skip triggering the sending unit to deliver the at least one flow entry to the network device.

With reference to the first possible implementation of the second aspect, in a second possible implementation, further including:

if a determining result of the determining unit is that the reserved subspace is not included, the second comparison subunit is triggered; and if the non-reserved free space is greater than or equal to the total capacity, the sending unit is triggered to deliver the at least one flow entry to the network device according to the device identifier, or if the non-reserved free space is less than the total capacity, the sending unit is not triggered to deliver the at least one flow entry to the network device.

With reference to the second aspect or the first or the second possible implementation of the second aspect, in a third possible implementation, the search unit further includes:

a sending subunit, configured to send a request message to the network device according to the device identifier, where the request message is used to request to obtain the storage information of the network device;

a receiving subunit, configured to receive a reply message with which the network device replies according to the request message, where the reply message is used to notify the controller of the storage information of the network device; and an obtaining subunit, configured to obtain the storage information of the network device from the reply message.

With reference to the third possible implementation of the second aspect, in a fourth possible implementation, the request message is an extended multipart multipart request message of the OpenFlow OpenFlow protocol, the extended multipart request message includes a type type field and a request body body field, the type field carries a type value indicating the storage information, and the request body field is empty or carries the device identifier; and correspondingly, the reply message is an extended multipart reply message of the OpenFlow protocol, the multipart reply message includes the type field and a reply body field, and the reply body field carries the storage information of the network device.

With reference to the second aspect or the first, the second, the third, or the fourth possible implementation of the second aspect, in a fifth possible implementation, the apparatus further includes:

an update unit, configured to: when the at least one flow entry is delivered to the network device, or a flow entry deletion notification sent by the network device is received, correspondingly update the storage information, where the flow entry deletion notification includes a capacity of a flow entry deleted by the network device, and a location at which the deleted flow entry is stored in the storage space before being deleted.

According to a third aspect, an embodiment of the present invention provides a flow entry storage method. The method includes:

sending, by a network device, storage information of the network device to a controller, where the storage information includes free space in storage space of the network device that is used to store a flow entry;

receiving, by the network device, at least one flow entry delivered by the controller, where the at least one flow entry is used to perform a function on the network device; and storing, by the network device, the at least one flow entry in the storage space.

In a first possible implementation of the third aspect, before the sending, by a network device, storage information of the network device to a controller, the method further includes:

obtaining, by the network device, a request message sent by the controller, where the request message is used to request to obtain the storage information of the network device; and the sending, by a network device, storage information of the network device to a controller includes:

replying, by the network device, with a reply message to the controller according to the request message, where the reply message is used to notify the controller of the storage information of the network device.

With reference to the first possible implementation of the third aspect, in a second possible implementation, the request message is an extended multipart multipart request message of the OpenFlow OpenFlow protocol, the extended multipart request message includes a type type field and a request body body field, the type field carries a type value indicating the storage information, and the request body field is empty or carries the device identifier; and correspondingly, the reply message is an extended multipart reply message of the OpenFlow protocol, the multipart reply message includes the type field and a reply body field, and the reply body field carries the storage information of the network device.

According to a fourth aspect, an embodiment of the present invention provides a flow entry storage apparatus. The apparatus includes:

a sending unit, configured to send storage information of the network device to a controller, where the storage information includes free space in storage space of the network device that is used to store a flow entry;

a receiving unit, configured to receive at least one flow entry delivered by the controller, where the at least one flow entry is used to perform a function on the network device; and a storage unit, configured to store the at least one flow entry in the storage space.

In a first possible implementation of the fourth aspect, the receiving unit is further configured to: before the sending unit is triggered, obtain a request message sent by the controller, where the request message is used to request to obtain the storage information of the network device; and the sending unit is specifically configured to reply with a reply message to the controller according to the request message, where the reply message is used to notify the controller of the storage information of the network device.

With reference to the first possible implementation of the fourth aspect, in a second possible implementation, the request message is an extended multipart multipart request message of the OpenFlow OpenFlow protocol, the extended multipart request message includes a type type field and a request body body field, the type field carries a type value indicating the storage information, and the request body field is empty or carries the device identifier; and correspondingly, the reply message is an extended multipart reply message of the OpenFlow protocol, the multipart reply message includes the type field and a reply body field, and the reply body field carries the storage information of the network device.

According to a fifth aspect, an embodiment of the present invention provides a flow entry delivering system. The system includes a controller and a network device, where the controller is configured to: obtain a device identifier of a network device and at least one flow entry that is used to perform a function on the network device; obtain storage information of the network device according to the device identifier, where the storage information includes free space in storage space of the network device that is used to store a flow entry; compare the free space with a total capacity of the at least one flow entry; and if the free space is greater than or equal to the total capacity, deliver the at least one flow entry to the network device according to the device identifier; or if the free space is less than the total capacity, skip delivering the at least one flow entry to the network device; and the network device is configured to: send storage information of the network device to a controller, where the storage information includes free space in storage space of the network device that is used to store a flow entry; receive at least one flow entry delivered by the controller, where the at least one flow entry is used to perform a function on the network device; and store the at least one flow entry in the storage space.

As can be seen from the foregoing technical solutions, before the controller delivers the at least one flow entry corresponding to the function to the network device to enable the network device to perform the function, the controller compares the total capacity of the at least one flow entry with the storage information of the network device, and determines, according to a comparison result, whether the network device has sufficient free storage space to store the at least one flow entry. When the network device has the storage space greater than or equal to the capacity of the flow entry, the controller delivers the at least one flow entry, or when the network device has no storage space to store the flow entry, the controller does not deliver the at least one flow entry, thereby improving a success rate of delivering a flow entry by the controller.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

A controller delivers a flow entry to a network device, so that the network device can perform a function by using the received flow entry. When a controller delivers a flow entry to a network device, the controller does not consider a storage status of storage space of the network device that is used to store a flow entry. When storage space of a network device that is used to store a flow entry is insufficient, a controller may still deliver a flow entry to the network device to enable the network device to perform a function. Because the network device has insufficient storage space in this case, the network device can store no flow entry or only a part of a received flow entry. As a result, the network device cannot perform the function by using the flow entry, and the controller unsuccessfully delivers the flow entry.

Further, a specific scenario is used as an example, and the problem in the conventional manner is described by using accompanying drawings. FIG. 1*a* is a schematic diagram of a first case of delivering a flow entry. In FIG. 1*a*, to enable a network device 1 to perform a function 1, an application (English: Application, APP for short) 1 needs to enable a controller to deliver four flow entries, that is, to-be-delivered flow entries 1 shown in FIG. 1*a* to the network device 1, but storage space of the network device 1 that is used to store a flow entry has free space to store only three flow entries. In the case shown in FIG. 1*a*, if the controller delivers the to-be-delivered flow entries 1, the network device 1 can store three of the four flow entries at most. As a result, the network device 1 cannot perform the function 1, and a storage resource of the network device 1 is wasted.

Figure 1:
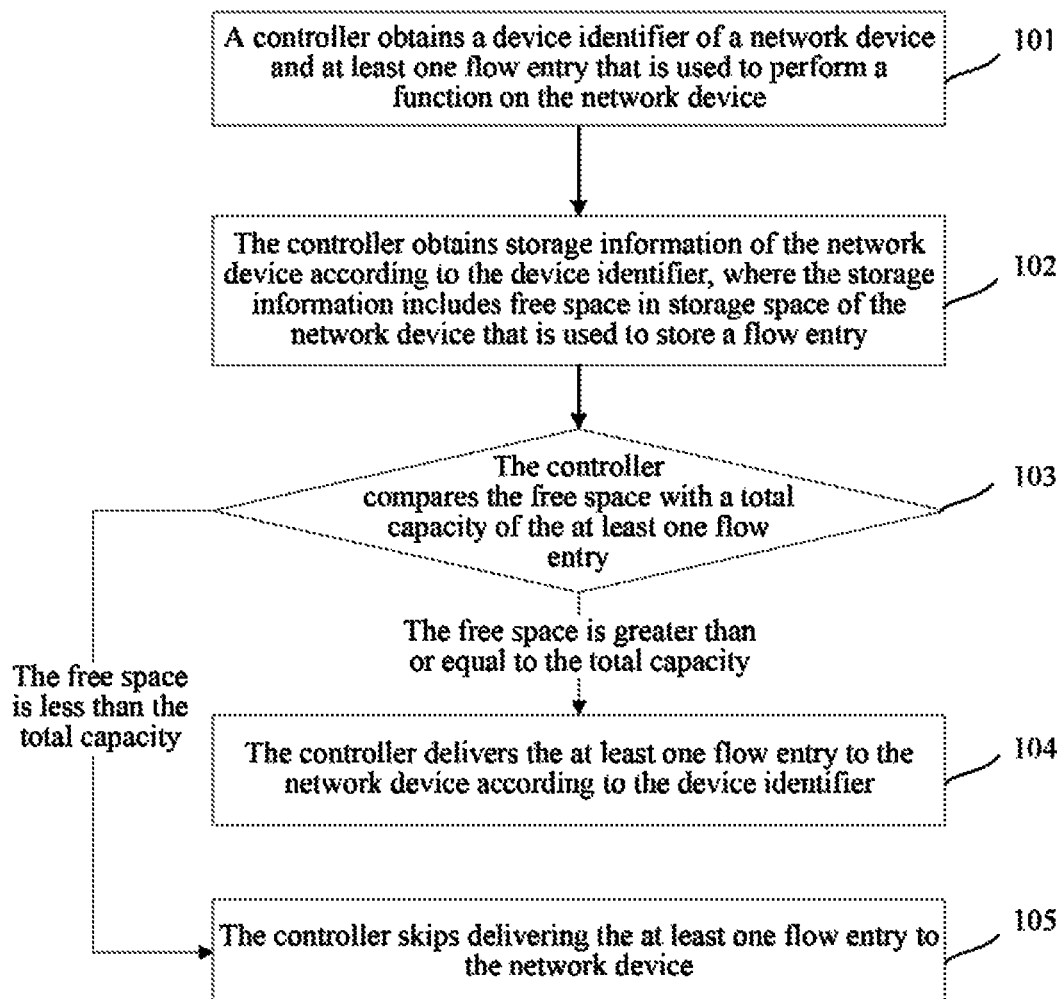
FIG. 1 is a method flowchart of a flow entry delivering method according to an embodiment of the present invention.
Figure 1A:
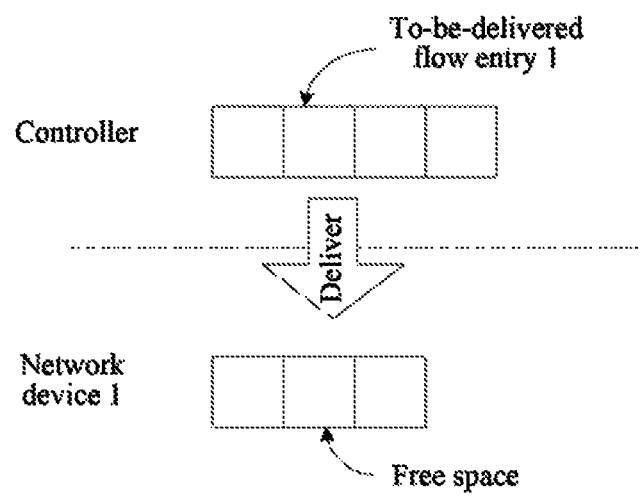
FIG. 1a is a schematic diagram of a first case of delivering a flow entry.
Figure 1B:
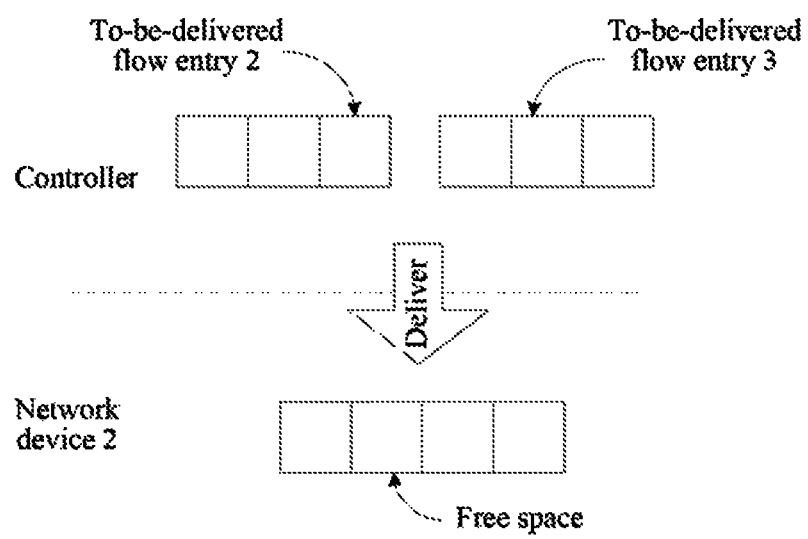
FIG. 1b is a schematic diagram of a second case of delivering a flow entry.

FIG. 1*b* is a schematic diagram of a second case of delivering a flow entry. In FIG. 1*b*, to enable a network device 2 to perform a function 2, an APP 2 needs to enable a controller to deliver three flow entries, that is, to-be-delivered flow entries 2 shown in FIG. 1*b* to the network device 2. In addition, to enable the network device 2 to perform a function 3, an APP 3 also needs to enable the controller to deliver three flow entries, that is, to-be-delivered flow entries 3 shown in FIG. 1*b* to the network device 2. However, storage space of the network device 2 that is used to store a flow entry has free space to store only four flow entries. In the case shown in FIG. 1*b*, if the controller delivers both the to-be-delivered flow entries 2 and the to-be-delivered flow entries 3 to the network device 2, the network device 2 may use two storage units of the original free space to store two of the three to-be-delivered flow entries 2, and use another two storage units of the original free space to store two of the three to-be-delivered flow entries 3. As a result, the network device 2 can perform neither the function 2 nor the function 3, and a storage resource of the network device 2 is wasted.

In view of this, the embodiments of the present invention provide a flow entry delivering method, a flow entry storage method, a related apparatus, and a related system. Before a controller delivers at least one flow entry corresponding to a function to a network device to enable the network device to perform the function, the controller compares a total capacity of the at least one flow entry with storage information of the network device, and determines, according to a comparison result, whether the network device has sufficient free storage space to store the at least one flow entry. When the network device has storage space greater than or equal to the capacity of the flow entry, the controller delivers the at least one flow entry, or when the network device has no storage space to store the flow entry, the controller does not deliver the at least one flow entry, thereby improving a success rate of delivering a flow entry by the controller.

Further, dedicated reserved space in the storage space of the network device may be allocated to some particular functions that need to be performed such as functions having higher priorities, some particular users such as important users who need to perform a function on the network device, or important APPs. In this way, when a flow entry related to the above description such as a flow entry related to a particular function, a flow entry generated by a particular user, or a flow entry generated by an important application needs to be delivered to the network device, the storage space has reserved storage space for specially storing the flow entry. In addition, even if the reserved free space of the storage space is insufficient, the flow entry may be stored in non-reserved free space when the non-reserved free space of the storage space is sufficient. Therefore, a probability that an important flow entry can be stored in the network device is ensured as much as possible, and use efficiency of the storage space is improved.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

FIG. 1 is a method flowchart of a flow entry delivering method according to an embodiment of the present invention. The method includes the following steps.

101: A controller obtains a device identifier of a network device and at least one flow entry that is used to perform a function on the network device.

In this embodiment of the present invention, the flow entry may be understood as a flow entry constructed when a user or an application intends to perform a function on the network device. To enable the network device to perform a function, the controller needs to deliver, to the network device, all flow entries that are related to the function and that need to be delivered, and herein all the flow entries that need to be delivered may be at least one flow entry. After the at least one flow entry is all successfully delivered to the network device or is stored by the network device in storage space for specially storing a flow entry, the network device can perform the function according to the at least one flow entry.

In this embodiment of the present invention, the flow entry delivering method is preferably applied to a network on which a software defined network (English: Software Defined Network, SDN for short) technology is deployed. The network device may be a forwarding device that is configured to perform routing and forwarding. For example, the network device may be a device such as a switch or a router that supports the OpenFlow protocol.

102: The controller obtains storage information of the network device according to the device identifier, where the storage information includes free space in storage space of the network device that is used to store a flow entry.

For example, if the controller has locally stored the storage information, the controller may locally perform search by using the device identifier, to find the storage information corresponding to the device identifier. Alternatively, even if the controller has locally stored the storage information, the controller may send a request message to the network device according to the device identifier, to request to obtain the storage information of the network device, and receive a reply message returned by the network device according to the request message, to obtain the storage information of the network device that is carried in the reply message. In addition, the controller may update the locally stored storage information by using the obtained storage information. Alternatively, even if the controller has not locally stored the storage information, the controller may send a request message to the network device according to the device identifier, to request to obtain the storage information of the network device, and receive a reply message returned by the network device according to the request message, to obtain the storage information of the network device that is carried in the reply message. It should be further noted that, alternatively, the network device may periodically automatically upload the storage information of the network device to the controller.

The storage information may be a parameter that is used to identify a storage status of the storage space of the network device that is specially used to store a flow entry, and may include parameters of storage space that has been used and free storage space that has not been used. This embodiment of the present invention mainly focuses on a parameter of free storage space that has not been used for storage.

Figure 2:
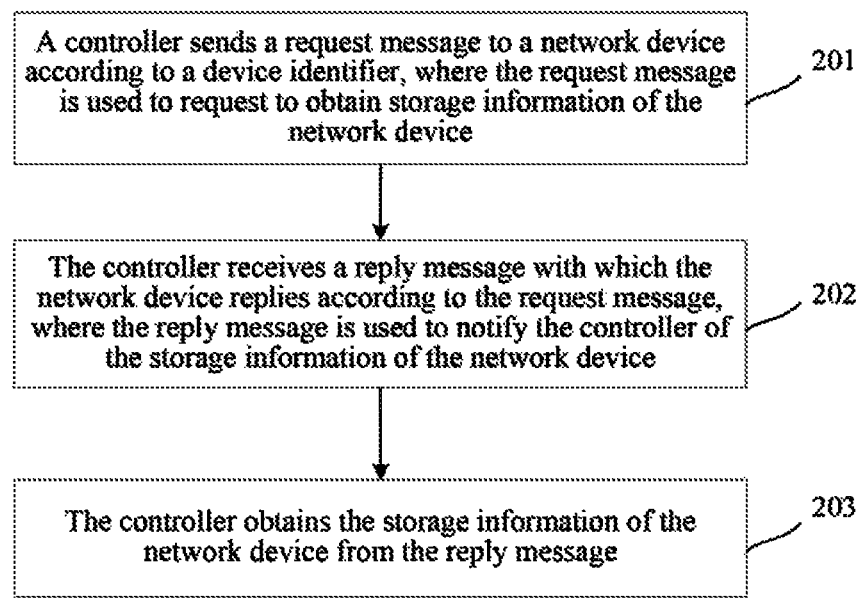
FIG. 2 is a method flowchart of a storage information obtaining method according to an embodiment of the present invention.

The request message and the reply message may be new specified messages, or may be new types of messages defined based on existing messages by extending a protocol. FIG. 2 is a method flowchart of a storage information obtaining method according to an embodiment of the present invention. The method includes:

201: The controller sends a request message to the network device according to the device identifier, where the request message is used to request to obtain the storage information of the network device.

202: The controller receives a reply message with which the network device replies according to the request message, where the reply message is used to notify the controller of the storage information of the network device.

203: The controller obtains the storage information of the network device from the reply message.

Optionally, this embodiment of the present invention further provides a manner of defining new types of messages based on existing messages by extending a protocol, to obtain the request message and the reply message.

In the OpenFlow protocol, status information of the network device may be transmitted between the controller and the network device by using a multipart message (Multipart Messages). The controller may send a multipart request message (English: Multipart request) to the network device to request to obtain the status information of the network device and the like. After the network device receives the multipart request message, the network device returns a multipart reply message (English: Multipart reply) to the controller, and adds a required status message to the multipart reply message. In formats of the multipart request message and the multipart reply message in the OpenFlow protocol, a type value may be set in a type field: "uint16_t type; /* One of the OFPMP_* constants. */". Different type values correspond to different status information. For example, if the controller needs to obtain status information 1 from the network device, the type (Type) field in the multipart request message sent by the controller to the network device may be set to a type value 1 corresponding to the status information 1. If status information 2 is required, the type field may be set to a type value 2 corresponding to the status information 2. That is, content carried in the multipart request message and the multipart reply message may be controlled by setting the type field. However, in the current OpenFlow protocol, it is not supported that the controller obtains the storage information of the network device from the network device by using a multipart message.

To perform a function of obtaining the storage information of the network device by the controller from the network device, in this embodiment of the present invention, the OpenFlow protocol is extended, and a new type value: storage information (STORAGE) is defined for the multipart request message and the multipart reply message. Details are as follows:

/* Storage description.
 * The request body is empty.
 * The reply body is struct ofp_storage. */
OFPMP_STORAGE = 14,
ofp_storage:
/* Body of reply to OFPMP_STORAGE request. */
struct ofp_storage {

```
uint32_t total_size; /* Total flow table entry size of the switch. */
uint32_t idle_size; /* Unused size of the flow table entry.*/
};
OFP_ASSERT(sizeof(struct ofp_desc) == 8).
```

It may be understood that, "storage information" is defined as a type value, the type value is 14, a request body (body) field of a multipart request packet having this type value is empty, a reply body field of the multipart reply message has an ofp_storage structure, and the ofp_storage structure includes a total capacity and a free capacity of the storage space of the network device that is used to store a flow entry.

If the controller and the network device use a multipart message that uses the new defined type value "STORAGE", the request message in the embodiment corresponding to FIG. 2 may be an extended multipart request message in the OpenFlow protocol, the extended multipart request message includes a type type field and a request body field, the type field carries a type value indicating the storage information, and the request field is empty or carries the device identifier. When the request field of the multipart request message carries the device identifier, functions such as verification may be performed by using the device identifier in the request field.

Correspondingly, the reply message is an extended multipart reply message of the OpenFlow protocol, the multipart reply message includes the type field and a reply body field, and the reply body field carries the storage information of the network device.

For example, when the network device receives the multipart request message, the network device identifies, by using a type value of a type field of the multipart request message, that the multipart request message is a request message that is used to request to obtain the storage information. The network device may generate a multipart reply message corresponding to the multipart request message, and add the storage information of the network device to a reply body field of the multipart reply message.

When the controller obtains the multipart reply message sent by the network device, the controller identifies, by using a type value of a type field of the multipart reply message, that the multipart reply message is a reply message that carries the storage information, and the controller obtains the required storage information from a reply body field of the multipart reply message.

103: The controller compares the free space with a total capacity of the at least one flow entry.

For example, the comparison is mainly used to determine whether remaining storage space of the network device is sufficient to store the at least one flow entry. Because capacities of flow entries are basically the same, the storage space may be indicated in a unit of a flow entry. For example, the free space is specifically three flow entries, and the total capacity of the at least one flow entry is specifically two flow entries. In this case, a comparison result is that the free space is greater than the total capacity.

104: If the free space is greater than or equal to the total capacity, the controller delivers the at least one flow entry to the network device according to the device identifier.

105: If the free space is less than the total capacity, the controller skips delivering the at least one flow entry to the network device.

For example, if the free space is greater than or equal to the total capacity, this may be understood as that the storage space of the network device has sufficient free space to store the at least one flow entry. In this case, normally, the at least one flow entry delivered by the controller to the network device can be stored by the network device in the storage space. The network device can perform the function by using the at least one flow entry.

If the free space is less than the total capacity, this may be understood as that the storage space of the network device has insufficient free space, and cannot store the at least one flow entry. In this case, even if the controller delivers the at least one flow entry to the network device, normally, the network device cannot store the at least one flow entry or can store only a part of the at least one flow entry at most when the at least one flow entry is multiple flow entries. Even if a part of the at least one flow entry can be stored, for example, the network device can store, when the at least one flow entry is specifically three flow entries, only two of the flow entries, the network device cannot perform, according to the stored part of the at least one flow entry such as the stored two flow entries, the function that can be originally performed only by using the three flow entries. In this case, from the perspective of the controller, this may be understood as that the flow entry is unsuccessfully delivered. In this case, the skipping delivering the at least one flow entry to the network device can effectively avoid a case in which the flow entry is unsuccessfully delivered because the network device cannot store the at least one flow entry, or can store only a part of the at least one flow entry, or can effectively reduce times a flow entry is unsuccessfully delivered.

It should be noted that, optionally, the controller may update the storage information if the storage information is stored in the controller.

When the controller delivers the at least one flow entry to the network device, or receives a flow entry deletion notification sent by the network device, the controller correspondingly updates the storage information, where the flow entry deletion notification includes a capacity of a flow entry deleted by the network device, and a location at which the deleted flow entry is stored in the storage space before being deleted.

For example, if the controller delivers the at least one flow entry to the network device after comparison, the controller correspondingly updates the storage information corresponding to the network device, reduces the free space by the total capacity of the at least one flow entry, and increases the non-free space, that is, used space by the total capacity of the at least one flow entry. If the flow entry deletion notification is received, the controller increases the free space by a capacity of a deleted flow entry, and reduces non-free space by the capacity of the deleted flow entry. Determining and comparison accuracy can be improved by updating the storage information. Therefore, this helps to improve a success rate of delivering a flow entry by the controller.

As can be seen, before the controller delivers the at least one flow entry corresponding to the function to the network device to enable the network device to perform the function, the controller compares the total capacity of the at least one flow entry with the storage information of the network device, and determines, according to a comparison result, whether the network device has sufficient free storage space to store the at least one flow entry. When the network device has storage space greater than or equal to the capacity of the flow entry, the controller delivers the at least one flow entry, or when the network device has no storage space to store the flow entry, the controller does not deliver the at least one flow entry, thereby improving a success rate of delivering a flow entry by the controller.

Embodiment 2

Figure 3:
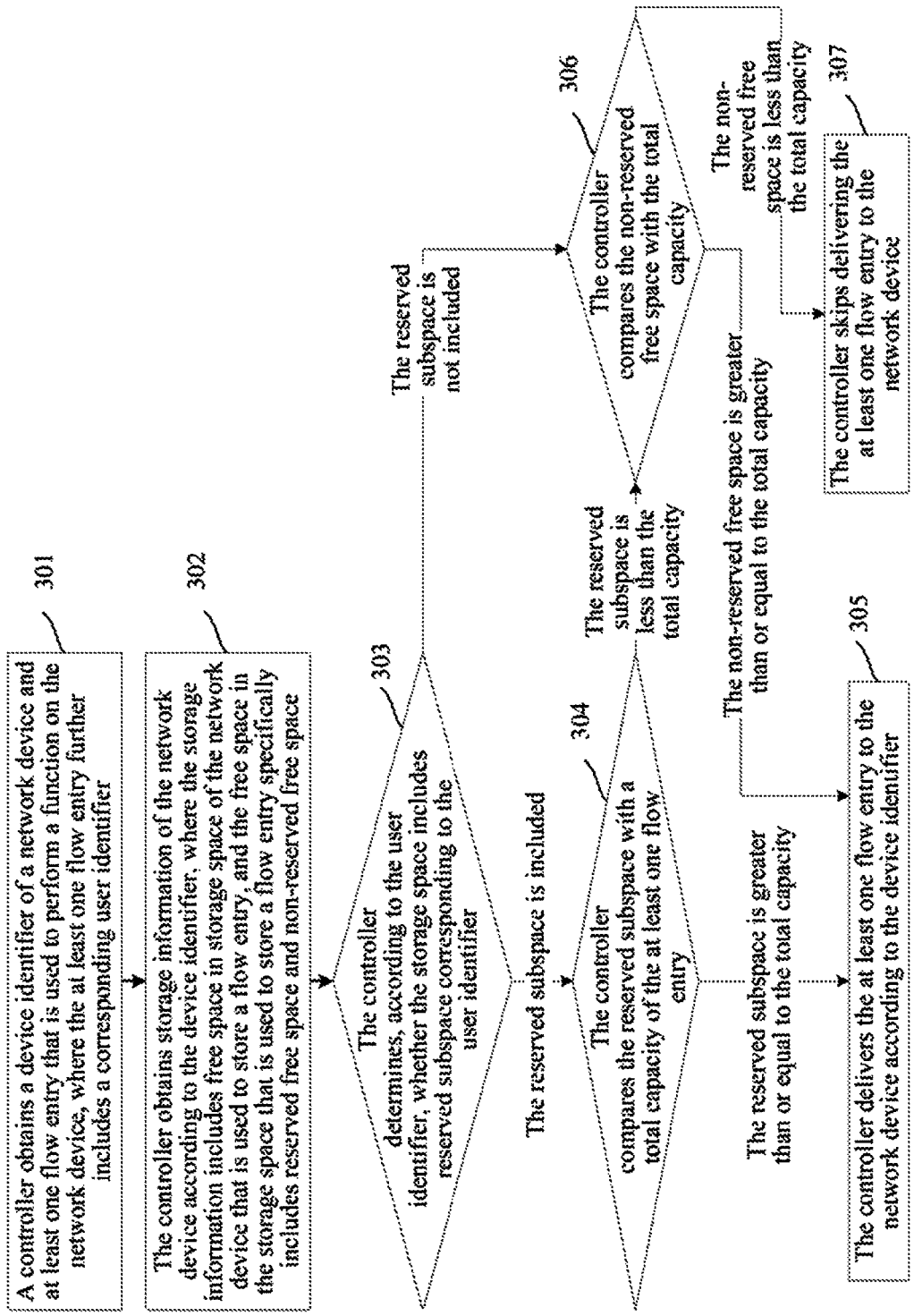
FIG. 3 is a method flowchart of a flow entry delivering method according to an embodiment of the present invention.

Based on the embodiment corresponding to FIG. 1, FIG. 3 is a method flowchart of a flow entry delivering method according to an embodiment of the present invention. The method includes the following steps.

301: A controller obtains a device identifier of a network device and at least one flow entry that is used to perform a function on the network device, where the at least one flow entry further includes a corresponding user identifier.

For example, it may be understood that the user identifier is used to identify that the at least one flow entry is constructed by a user or an application, or it may be understood that the user identifier is used to identify the function corresponding to the at least one flow entry. The user may be a user using the network device, for example, a tenant in a data center scenario.

302: The controller finds storage information of the network device according to the device identifier, where the storage information includes free space in storage space of the network device that is used to store a flow entry, and the free space in the storage space that is used to store a flow entry specifically includes reserved free space and non-reserved free space.

For example, in this embodiment of the present invention, the reserved may be understood as that a part of free space is reserved as reserved space in the storage space, and the reserved space is used to specially store the flow entry corresponding to the user identifier. The reserved free space may be understood as space that has not been used in the reserved space. The non-reserved free space may be understood as other free space than the reserved free space in the free space.

303: The controller determines, according to the user identifier, whether the storage space includes reserved subspace corresponding to the user identifier, where the reserved subspace is part or all of the reserved free space; if the reserved subspace is included, perform 304.

For example, the reserved space may include one or more pieces of subspace. For example, both a user identifier A and a user identifier B have reserved space in the storage space. Part that is of the reserved space and that is specially used for the user identifier A may be understood as subspace A corresponding to the user identifier A. Part that is of the reserved space and that is specially used for the user identifier B may be understood as subspace B corresponding to the user identifier B. In this embodiment of the present invention, the reserved subspace is specifically free space that has not been used and that is in subspace reserved for the user identifier.

If the user identifier is used to identify that the at least one flow entry is constructed by a user or an application, subspace that is in the reserved space and that corresponds to the user identifier may be specially used to store the flow entry constructed by the user or the application. If the user identifier is used to identify the function corresponding to the at least one flow entry, subspace that is in the reserved space and that corresponds to the user identifier may be specially used to store the flow entry that enables the network device to perform the function.

It should be noted that, optionally, if the controller determines, according to the user identifier, that the storage space does not include the reserved subspace in 303, perform 306. For specific implementation content, refer to a related description in 306.

304: The controller compares the reserved subspace with a total capacity of the at least one flow entry; if the reserved subspace is greater than or equal to the total capacity, perform 305; or if the reserved subspace is less than the total capacity, perform 306.

305: The controller delivers the at least one flow entry to the network device according to the device identifier.

For example, if the reserved subspace is greater than or equal to the total capacity, this may be understood as that the reserved space that is reserved for the user identifier and that is in the storage space of the network device has sufficient free space to store the at least one flow entry. In this case, normally, the at least one flow entry delivered by the controller to the network device can be stored by the network device in the reserved subspace of the storage space. The network device can perform the function by using the at least one flow entry.

If the reserved subspace is less than the total capacity, this may be understood as that the reserved space that is reserved for the user identifier and that is in the storage space of the network device has no sufficient free space to store the at least one flow entry. In this case, it may be further determined, by comparison, whether the non-reserved free space can store the at least one flow entry.

306: The controller compares the non-reserved free space with the total capacity; if the non-reserved free space is greater than or equal to the total capacity, perform 305.

That is, when corresponding subspace includes no sufficient free space, a flow entry whose user identifier corresponds to the subspace in the reserved space may be further stored in the non-reserved free space. The non-reserved free space may be understood as a free area in shared space storing a flow entry, that is, a user identifier of a flow entry stored in the non-reserved free space is not limited.

If the non-reserved free space is greater than or equal to the total capacity, this may be understood as that the non-reserved free space of the storage space of the network device has sufficient free space to store the at least one flow entry. The controller can deliver the at least one flow entry to the network device.

It should be noted that, if the controller finds, by comparison, that the non-reserved free space is less than the total capacity in 306, perform 307.

307: The controller skips delivering the at least one flow entry to the network device.

For example, when the storage space of the network device cannot store all of the at least one flow entry, the skipping delivering the at least one flow entry to the network device can effectively avoid a case in which the flow entry is unsuccessfully delivered because the network device cannot store the at least one flow entry, or can store only a part of the at least one flow entry, or can effectively reduce times a flow entry is unsuccessfully delivered.

Further, dedicated reserved space in the storage space of the network device may be allocated to some particular functions that need to be performed such as functions having higher priorities, some particular users such as important users who need to perform a function on the network device, or important APPs. In this way, when a flow entry related to the above description such as a flow entry related to a particular function, a flow entry generated by a particular user, or a flow entry generated by an important application needs to be delivered to the network device, the storage space has reserved storage space for specially storing the flow entry. In addition, even if the reserved free space of the storage space is insufficient, the flow entry may be stored in non-reserved free space when the non-reserved free space of the storage space is sufficient. Therefore, a probability that an important flow entry can be stored in the network device is ensured as much as possible, and use efficiency of the storage space is improved.

Optionally, the following further describes how the controller updates the storage information when the storage space includes reserved space and non-reserved space, and the storage information is stored in the controller.

When the controller delivers the at least one flow entry to the network device, or receives a flow entry deletion notification sent by the network device, the controller correspondingly updates the storage information, where the flow entry deletion notification includes a capacity of a flow entry deleted by the network device, and a location at which the deleted flow entry is stored in the storage space before being deleted.

Examples are used to describe different cases in which the controller correspondingly updates the storage information corresponding to the network device.

If the reserved subspace is greater than or equal to the total capacity, the controller delivers the at least one flow entry to the network device, and the controller reduces the reserved subspace by the total capacity.

If the non-reserved free space is greater than or equal to the total capacity, the controller delivers the at least one flow entry to the network device, and the controller reduces the non-reserved free space by the total capacity.

If the controller receives the flow entry deletion notification, the controller may update the storage information according to a location at which the deleted flow entry is stored in the storage space before being deleted. For example, when the location at which the deleted flow entry is stored in the storage space before being deleted is specifically corresponding subspace of the reserved space, the controller may increase the reserved subspace of the subspace by a capacity of the deleted flow entry. For example, when the location at which the deleted flow entry is stored in the storage space before being deleted is specifically non-reserved space, the controller may increase non-reserved free space by a capacity of the deleted flow entry. Determining and comparison accuracy can be improved by updating the storage information. Therefore, this helps to improve a success rate of delivering a flow entry by the controller.

Embodiment 3

Figure 4:
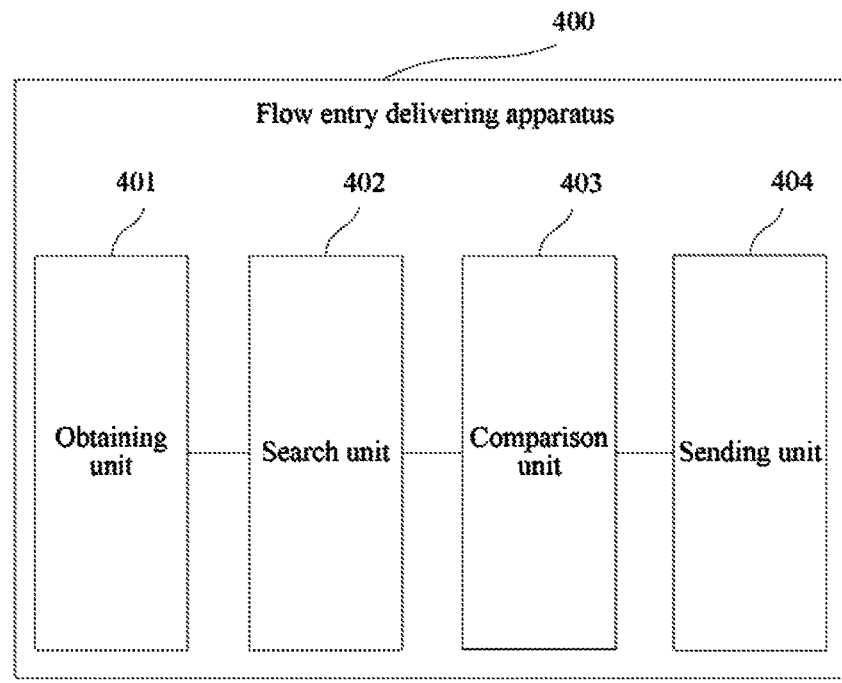
FIG. 4 is a structural apparatus diagram of a flow entry delivering apparatus according to an embodiment of the present invention.

FIG. 4 is a structural apparatus diagram of a flow entry delivering apparatus 400 according to an embodiment of the present invention. The flow entry delivering apparatus 400 includes: an obtaining unit 401, a search unit 402, and a comparison unit 403.

The obtaining unit 401 is configured to obtain a device identifier of a network device and at least one flow entry that is used to perform a function on the network device.

In this embodiment of the present invention, the flow entry may be understood as a flow entry constructed when a user or an application intends to perform a function on the network device. To enable the network device to perform a function, the controller needs to deliver, to the network device, all flow entries that are related to the function and that need to be delivered, and herein all the flow entries that need to be delivered may be at least one flow entry. After the at least one flow entry is all successfully delivered to the network device or is stored by the network device in storage space for specially storing a flow entry, the network device can perform the function according to the at least one flow entry.

In this embodiment of the present invention, the flow entry delivering apparatus is preferably applied to a network on which an SDN technology is deployed. The network device may be a forwarding device that is configured to perform routing and forwarding. For example, the network device may be a device such as a switch or a router that supports the OpenFlow protocol.

The search unit 402 is configured to find storage information of the network device according to the device identifier, where the storage information includes free space in storage space of the network device that is used to store a flow entry.

For example, if the controller has locally stored the storage information, the search unit 402 may locally perform search by using the device identifier, to find the storage information corresponding to the device identifier. Alternatively, even if the controller has locally stored the storage information, the search unit 402 may send a request message to the network device according to the device identifier, to request to obtain the storage information of the network device, and receive a reply message returned by the network device according to the request message, to obtain the storage information of the network device that is carried in the reply message. In addition, the controller may update the locally stored storage information by using the obtained storage information. Alternatively, even if the controller has not locally stored the storage information, the search unit 402 may send a request message to the network device according to the device identifier, to request to obtain the storage information of the network device, and receive a reply message returned by the network device according to the request message, to obtain the storage information of the network device that is carried in the reply message. It should be further noted that, alternatively, the network device may periodically automatically upload the storage information of the network device to the controller.

The storage information may be a parameter that is used to identify a storage status of the storage space of the network device that is specially used to store a flow entry, and may include parameters of storage space that has been used and free storage space that has not been used. This embodiment of the present invention mainly focuses on a parameter of free storage space that has not been used for storage.

Figure 5:
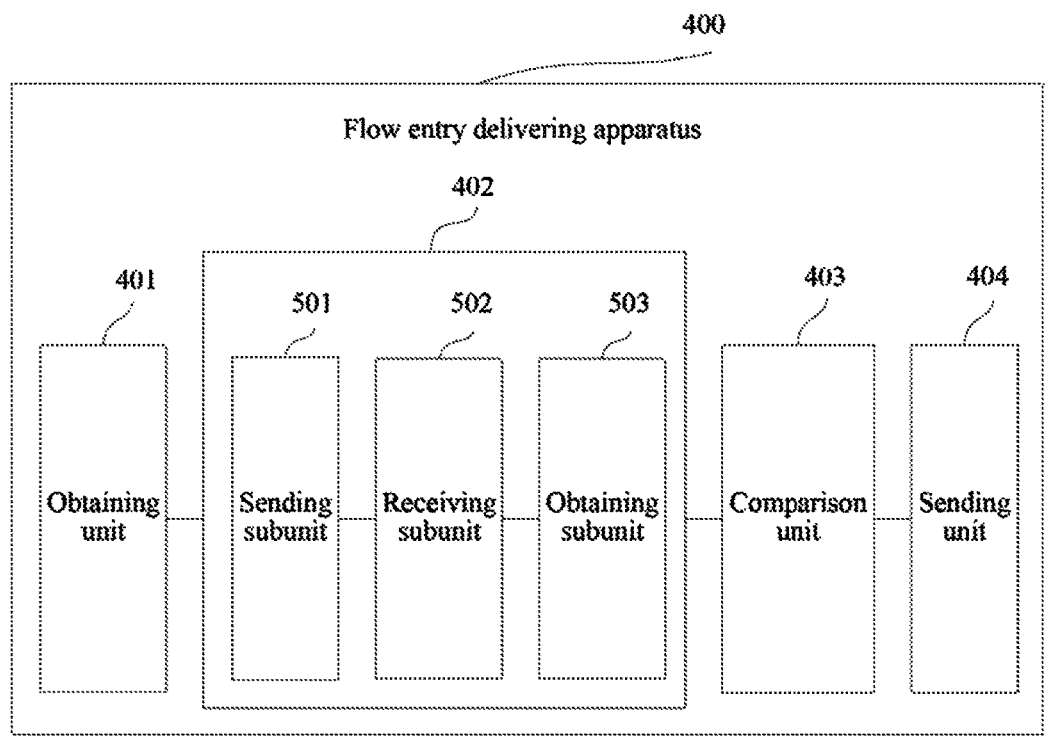
FIG. 5 is a structural apparatus diagram of a flow entry delivering apparatus according to an embodiment of the present invention.

The request message and the reply message may be new specified messages, or may be new types of messages defined based on existing messages by extending a protocol. Based on the embodiment corresponding to FIG. 4, FIG. 5 is a structural apparatus diagram of a flow entry delivering apparatus according to an embodiment of the present invention. The search unit 402 of the flow entry delivering apparatus 400 further includes:

a sending subunit 501, configured to send a request message to the network device according to the device identifier, where the request message is used to request to obtain the storage information of the network device;

a receiving subunit 502, configured to receive a reply message with which the network device replies according to the request message, where the reply message is used to notify the controller of the storage information of the network device; and an obtaining subunit 503, configured to obtain the storage information of the network device from the reply message.

Optionally, this embodiment of the present invention further provides a manner of defining new types of messages based on existing messages by extending a protocol, to obtain the request message and the reply message.

In the OpenFlow protocol, status information of the network device may be transmitted between the controller and the network device by using a multipart message. The controller may send a multipart request message to the network device to request to obtain the status information of the network device and the like. After the network device receives the multipart request message, the network device returns a multipart reply message to the controller, and adds a required status message to the multipart reply message. In formats of the multipart request message and the multipart reply message in the OpenFlow protocol, a type value may be set in a type field: "uint16_t type; /* One of the OFPMP_* constants. */". Different type values correspond to different status information. For example, if the controller needs to obtain status information 1 from the network device, the type (Type) field in the multipart request message sent by the controller to the network device may be set to a type value 1 corresponding to the status information 1. If status information 2 is required, the type field may be set to a type value 2 corresponding to the status information 2. That is, content carried in the multipart request message and the multipart reply message may be controlled by setting the type field. However, in the current OpenFlow protocol, it is not supported that the controller obtains the storage information of the network device from the network device by using a multipart message.

To perform a function of obtaining the storage information of the network device by the controller from the network device, in this embodiment of the present invention, the OpenFlow protocol is extended, and a new type value: storage information (STORAGE) is defined for the multipart request message and the multipart reply message. Details are as follows:

```
/* Storage description.
* The request body is empty.
* The reply body is struct ofp_storage. */
OFPMP_STORAGE = 14,
ofp_storage:
/* Body of reply to OFPMP_STORAGE request.*/
struct ofp_ storage {
uint32_t total_size; /* Total flow table entry size of the switch. */
uint32_t idle_size; /* Unused size of the flow table entry.*/
};
OFP_ASSERT(sizeof(struct ofp_desc) == 8).
```

It may be understood that, "storage information" is defined as a type value, the type value is 14, a request body (body) field of a multipart request packet having this type value is empty, a reply body field of the multipart reply message has an ofp_storage structure, and the ofp_storage structure includes a total capacity and a free capacity of the storage space of the network device that is used to store a flow entry.

If the controller and the network device use a multipart message that uses the new defined type value "STORAGE", the request message in the embodiment corresponding to FIG. 2 may be an extended multipart request message in the OpenFlow protocol, the extended multipart request message includes a type type field and a request body field, the type field carries a type value indicating the storage information, and the request field is empty or carries the device identifier. When the request field of the multipart request message carries the device identifier, functions such as verification may be performed by using the device identifier in the request field.

Correspondingly, the reply message is an extended multipart reply message of the OpenFlow protocol, the multipart reply message includes the type field and a reply body field, and the reply body field carries the storage information of the network device.

For example, when the network device receives the multipart request message, the network device identifies, by using a type value of a type field of the multipart request message, that the multipart request message is a request message that is used to request to obtain the storage information. The network device may generate a multipart reply message corresponding to the multipart request message, and add the storage information of the network device to a reply body field of the multipart reply message.

When the controller obtains the multipart reply message sent by the network device, the controller identifies, by using a type value of a type field of the multipart reply message, that the multipart reply message is a reply message that carries the storage information, and the controller obtains the required storage information from a reply body field of the multipart reply message.

The comparison unit 403 is configured to compare the free space with a total capacity of the at least one flow entry.

For example, the comparison is mainly used to determine whether remaining storage space of the network device is sufficient to store the at least one flow entry. Because capacities of flow entries are basically the same, the storage space may be indicated in a unit of a flow entry. For example, the free space is specifically three flow entries, and the total capacity of the at least one flow entry is specifically two flow entries. In this case, a comparison result is that the free space is greater than the total capacity.

If the free space is greater than or equal to the total capacity, a sending unit 404 is triggered to deliver the at least one flow entry to the network device according to the device identifier.

If the free space is less than the total capacity, the sending unit 404 is not triggered to deliver the at least one flow entry to the network device.

For example, if the free space is greater than or equal to the total capacity, this may be understood as that the storage space of the network device has sufficient free space to store the at least one flow entry. In this case, normally, the at least one flow entry delivered by the sending unit 404 to the network device can be stored by the network device in the storage space. The network device can perform the function by using the at least one flow entry.

If the free space is less than the total capacity, this may be understood as that the storage space of the network device has insufficient free space, and cannot store the at least one flow entry. In this case, even if the sending unit 404 delivers the at least one flow entry to the network device, normally, the network device cannot store the at least one flow entry or can store only a part of the at least one flow entry at most when the at least one flow entry is multiple flow entries. Even if a part of the at least one flow entry can be stored, for example, the network device can store, when the at least one flow entry is specifically three flow entries, only two of the flow entries, the network device cannot perform, according to the stored part of the at least one flow entry such as the stored two flow entries, the function that can be originally performed only by using the three flow entries. In this case, from the perspective of the controller, this may be understood as that the flow entry is unsuccessfully delivered. In this case, the skipping delivering the at least one flow entry to the network device can effectively avoid a case in which the flow entry is unsuccessfully delivered because the network device cannot store the at least one flow entry, or can store only a part of the at least one flow entry, or can effectively reduce times a flow entry is unsuccessfully delivered.

Figure 6:
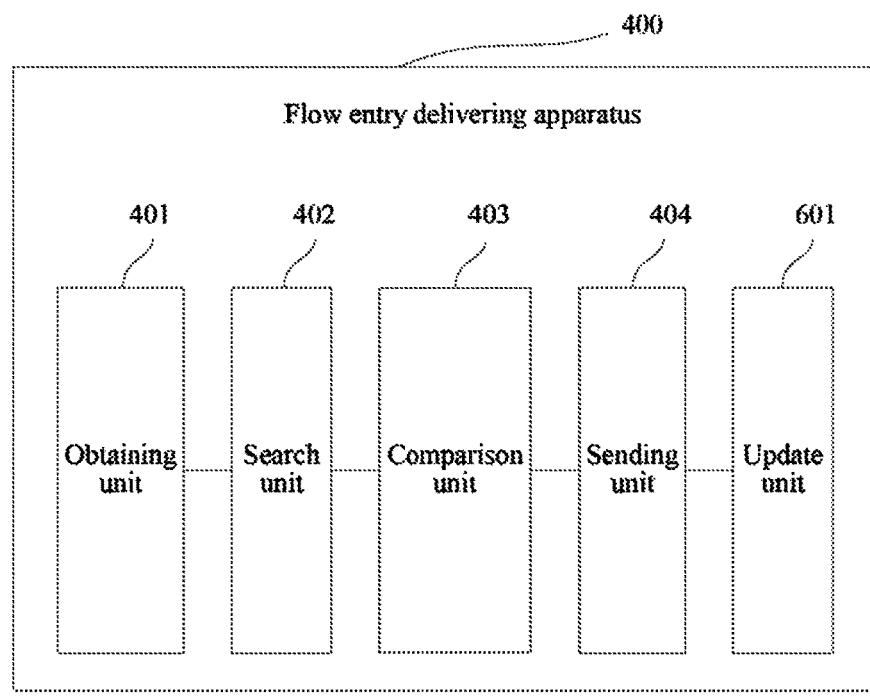
FIG. 6 is a structural apparatus diagram of a flow entry delivering apparatus according to an embodiment of the present invention.

It should be noted that, optionally, an update unit 601 may update the storage information if the storage information is stored in the controller. Based on the embodiment corresponding to FIG. 4, FIG. 6 is a structural apparatus diagram of a flow entry delivering apparatus according to an embodiment of the present invention. The flow entry delivering apparatus 400 further includes:

the update unit 601, configured to: when the at least one flow entry is delivered to the network device, or a flow entry deletion notification sent by the network device is received, correspondingly update the storage information, where the flow entry deletion notification includes a capacity of a flow entry deleted by the network device, and a location at which the deleted flow entry is stored in the storage space before being deleted.

For example, if the at least one flow entry is delivered to the network device after the comparison unit 403 performs comparison, the update unit 601 correspondingly updates the storage information corresponding to the network device, reduces the free space by the total capacity of the at least one flow entry, and increases the non-free space, that is, used space by the total capacity of the at least one flow entry. If the flow entry deletion notification is received, the update unit 601 increases the free space by a capacity of a deleted flow entry, and reduces non-free space by the capacity of the deleted flow entry. Determining and comparison accuracy can be improved by updating the storage information. Therefore, this helps to improve a success rate of delivering a flow entry by the controller.

As can be seen, before the controller delivers the at least one flow entry corresponding to the function to the network device to enable the network device to perform the function, the controller compares the total capacity of the at least one flow entry with the storage information of the network device, and determines, according to a comparison result, whether the network device has sufficient free storage space to store the at least one flow entry. When the network device has storage space greater than or equal to the capacity of the flow entry, the controller delivers the at least one flow entry, or when the network device has no storage space to store the flow entry, the controller does not deliver the at least one flow entry, thereby improving a success rate of delivering a flow entry by the controller.

Embodiment 4

Based on Embodiment 3, the free space in the storage space that is used to store a flow entry specifically includes reserved free space and non-reserved free space, and the at least one flow entry further includes a corresponding user identifier.

For example, in this embodiment of the present invention, the reserved may be understood as that a part of free space is reserved as reserved space in the storage space, and the reserved space is used to specially store the flow entry corresponding to the user identifier. The reserved free space may be understood as space that has not been used in the reserved space. The non-reserved free space may be understood as other free space than the reserved free space in the free space.

For example, it may be understood that the user identifier is used to identify that the at least one flow entry is constructed by a user or an application, or it may be understood that the user identifier is used to identify the function corresponding to the at least one flow entry. The user may be a user using the network device, for example, a tenant in a data center scenario.

Figure 7:
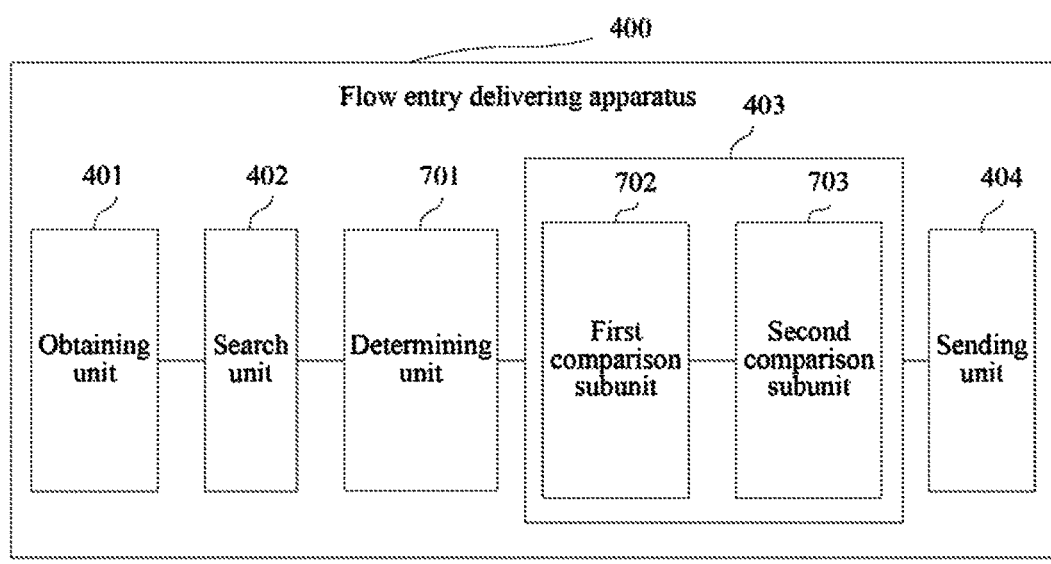
FIG. 7 is a structural apparatus diagram of a flow entry delivering apparatus according to an embodiment of the present invention.

Based on the embodiment corresponding to FIG. 4, FIG. 7 is a structural apparatus diagram of a flow entry delivering apparatus according to an embodiment of the present invention. The controller 400 further includes:

a determining unit 701, configured to: determine, according to the user identifier, whether the storage space includes reserved subspace corresponding to the user identifier, where the reserved subspace is part or all of the reserved free space.

For example, the reserved space may include one or more pieces of subspace. For example, both a user identifier A and a user identifier B have reserved space in the storage space. Part that is of the reserved space and that is specially used for the user identifier A may be understood as subspace A corresponding to the user identifier A. Part that is of the reserved space and that is specially used for the user identifier B may be understood as subspace B corresponding to the user identifier B. In this embodiment of the present invention, the reserved subspace is specifically free space that has not been used and that is in subspace reserved for the user identifier.

If the user identifier is used to identify that the at least one flow entry is constructed by a user or an application, subspace that is in the reserved space and that corresponds to the user identifier may be specially used to store the flow entry constructed by the user or the application. If the user identifier is used to identify the function corresponding to the at least one flow entry, subspace that is in the reserved space and that corresponds to the user identifier may be specially used to store the flow entry that enables the network device to perform the function.

If the reserved subspace is included, a first comparison subunit 702 included in the comparison unit 403 is triggered, where the first comparison subunit 702 is configured to: compare the reserved subspace with the total capacity of the at least one flow entry, and if the reserved subspace is greater than or equal to the total capacity, trigger the sending unit 404 to deliver the at least one flow entry to the network device according to the device identifier.

For example, if the reserved subspace is greater than or equal to the total capacity, this may be understood as that the reserved space that is reserved for the user identifier and that is in the storage space of the network device has sufficient free space to store the at least one flow entry. In this case, normally, the at least one flow entry delivered by the sending unit 404 to the network device can be stored by the network device in the reserved subspace of the storage space. The network device can perform the function by using the at least one flow entry.

If the reserved subspace is less than the total capacity, this may be understood as that the reserved space that is reserved for the user identifier and that is in the storage space of the network device has no sufficient free space to store the at least one flow entry. In this case, it may be further determined, by comparison, whether the non-reserved free space can store the at least one flow entry.

If the reserved subspace is less than the total capacity, or if a determining result of the determining unit 701 is that the reserved subspace is not included, a second comparison subunit 703 included in the comparison unit 403 is triggered, where the second comparison subunit 703 is configured to: compare the non-reserved free space with the total capacity; and if the non-reserved free space is greater than or equal to the total capacity, trigger the sending unit 404 to deliver the at least one flow entry to the network device according to the device identifier.

That is, when corresponding subspace includes no sufficient free space, a flow entry whose user identifier corresponds to the subspace in the reserved space may be further stored in the non-reserved free space. The non-reserved free space may be understood as a free area in shared space storing a flow entry, that is, a user identifier of a flow entry stored in the non-reserved free space is not limited.

If the non-reserved free space is greater than or equal to the total capacity, this may be understood as that the non-reserved free space of the storage space of the network device has sufficient free space to store the at least one flow entry. The sending unit 404 can deliver the at least one flow entry to the network device.

If the non-reserved free space is less than the total capacity, the sending unit 404 is not triggered to deliver the at least one flow entry to the network device.

For example, when the storage space of the network device cannot store all of the at least one flow entry, the skipping delivering the at least one flow entry to the network device can effectively avoid a case in which the flow entry is unsuccessfully delivered because the network device cannot store the at least one flow entry, or can store only a part of the at least one flow entry, or can effectively reduce times a flow entry is unsuccessfully delivered.

Further, dedicated reserved space in the storage space of the network device may be allocated to some particular functions that need to be performed such as functions having higher priorities, some particular users such as important users who need to perform a function on the network device, or important APPs. In this way, when a flow entry related to the above description such as a flow entry related to a particular function, a flow entry generated by a particular user, or a flow entry generated by an important application needs to be delivered to the network device, the storage space has reserved storage space for specially storing the flow entry. In addition, even if the reserved free space of the storage space is insufficient, the flow entry may be stored in non-reserved free space when the non-reserved free space of the storage space is sufficient. Therefore, a probability that an important flow entry can be stored in the network device is ensured as much as possible, and use efficiency of the storage space is improved.

Optionally, the following further describes how the update unit 601 updates the storage information when the storage space includes reserved space and non-reserved space, and the storage information is stored in the controller.

When the at least one flow entry is delivered to the network device, or a flow entry deletion notification sent by the network device is received, the update unit 601 correspondingly updates the storage information, where the flow entry deletion notification includes a capacity of a flow entry deleted by the network device, and a location at which the deleted flow entry is stored in the storage space before being deleted.

Examples are used to describe different cases in which the update unit 601 correspondingly updates the storage information corresponding to the network device.

If the reserved subspace is greater than or equal to the total capacity, the sending unit 304 delivers the at least one flow entry to the network device, and the update unit 601 reduces the reserved subspace by the total capacity.

If the non-reserved free space is greater than or equal to the total capacity, the sending unit 404 delivers the at least one flow entry to the network device, and the update unit 601 reduces the non-reserved free space by the total capacity.

If the controller receives the flow entry deletion notification, the update unit 601 may update the storage information according to a location at which the deleted flow entry is stored in the storage space before being deleted. For example, when the location at which the deleted flow entry is stored in the storage space before being deleted is specifically corresponding subspace of the reserved space, the update unit 601 may increase the reserved subspace of the subspace by a capacity of the deleted flow entry. For example, when the location at which the deleted flow entry is stored in the storage space before being deleted is specifically non-reserved space, the update unit 601 may increase non-reserved free space by a capacity of the deleted flow entry. Determining and comparison accuracy can be improved by updating the storage information. Therefore, this helps to improve a success rate of delivering a flow entry by the controller.

Embodiment 5

Figure 8:
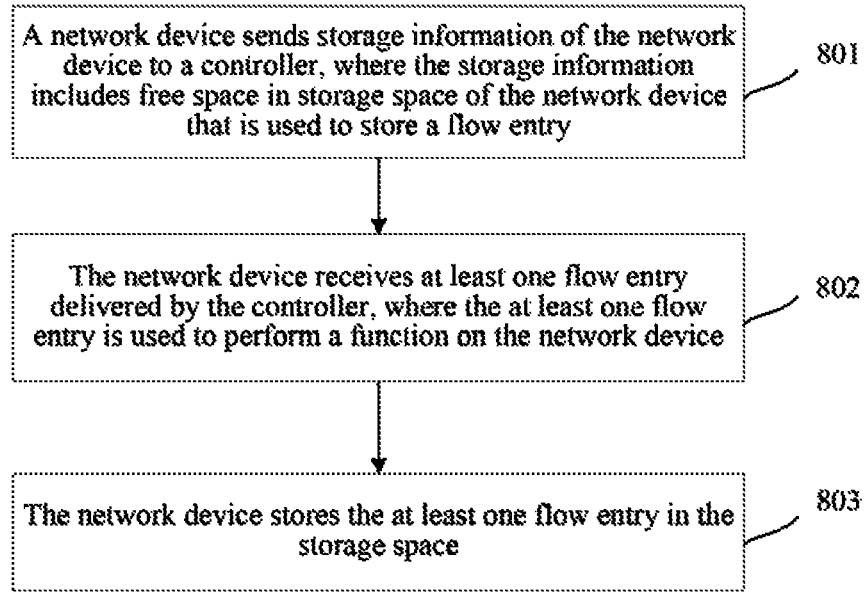
FIG. 8 is a method flowchart of a flow entry storage method according to an embodiment of the present invention.

FIG. 8 is a method flowchart of a flow entry storage method according to an embodiment of the present invention. The method includes:

801: A network device sends storage information of the network device to a controller, where the storage information includes free space in storage space of the network device that is used to store a flow entry.

For content of this step, refer to the related description in 102 in the embodiment corresponding to FIG. 1 and the related description in the embodiment corresponding to FIG. 2. Details are not described herein again.

802: The network device receives at least one flow entry delivered by the controller, where the at least one flow entry is used to perform a function on the network device.

803: The network device stores the at least one flow entry in the storage space.

Figure 9:
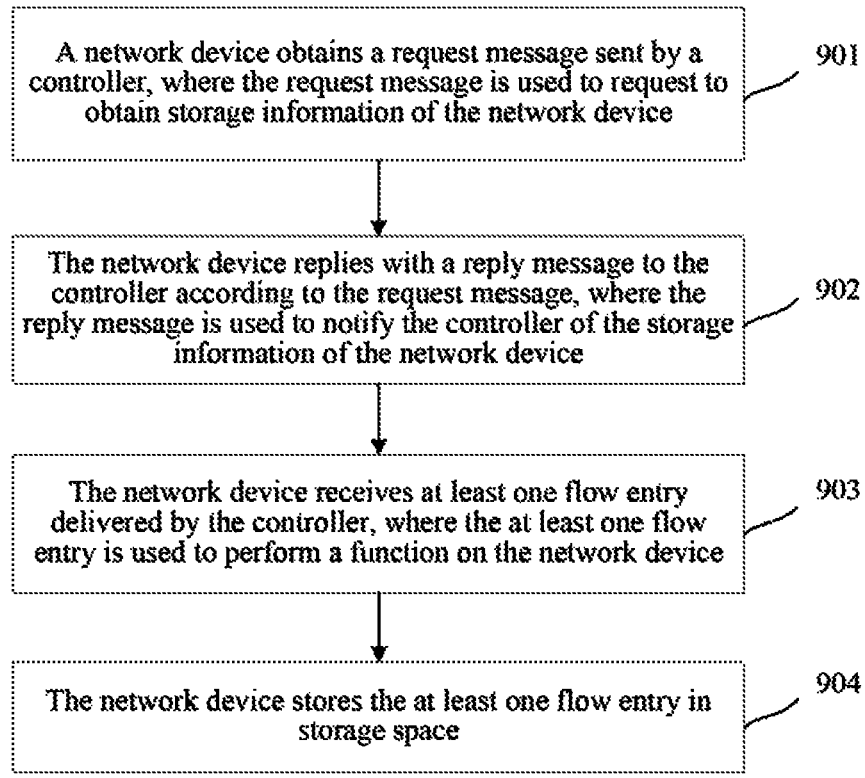
FIG. 9 is a method flowchart of a flow entry storage method according to an embodiment of the present invention.

Optionally, based on the embodiment corresponding to FIG. 8, FIG. 9 is a method flowchart of a flow entry storage method according to an embodiment of the present invention. The method includes:

901: The network device obtains a request message sent by the controller, where the request message is used to request to obtain the storage information of the network device.

902: The network device replies with a reply message to the controller according to the request message, where the reply message is used to notify the controller of the storage information of the network device.

903: The network device receives the at least one flow entry delivered by the controller, where the at least one flow entry is used to perform a function on the network device.

904: The network device stores the at least one flow entry in the storage space.

Optionally, the request message is an extended multipart request message of the OpenFlow protocol, the extended multipart request message includes a type field and a request body field, the type field carries a type value indicating the storage information, and the request body field is empty or carries the device identifier.

Correspondingly, the reply message is an extended multipart reply message of the OpenFlow protocol, the multipart reply message includes the type field and a reply body field, and the reply body field carries the storage information of the network device.

Embodiment 6

Figure 10:
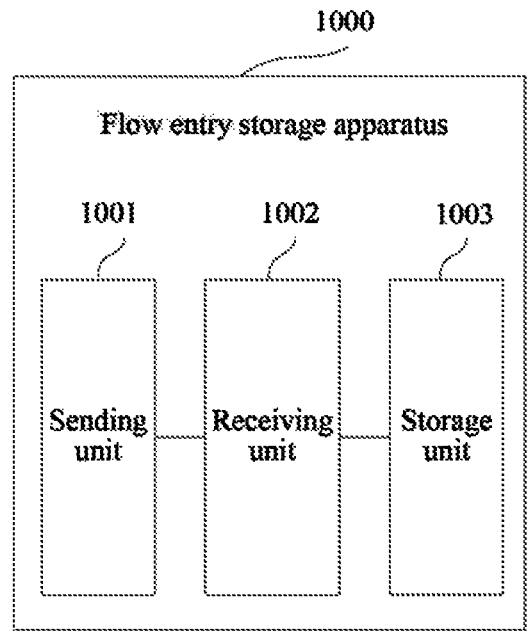
FIG. 10 is a structural apparatus diagram of a flow entry storage apparatus according to an embodiment of the present invention.

FIG. 10 is a structural apparatus diagram of a flow entry storage apparatus according to an embodiment of the present invention. The flow entry storage apparatus 1000 includes:

a sending unit 1001, configured to send storage information of the network device to a controller, where the storage information includes free space in storage space of the network device that is used to store a flow entry;

a receiving unit 1002, configured to receive at least one flow entry delivered by the controller, where the at least one flow entry is used to perform a function on the network device; and a storage unit 1003, configured to store the at least one flow entry in the storage space.

Optionally, the receiving unit 1002 is further configured to: before the sending unit 1001 is triggered, obtain a request message sent by the controller, where the request message is used to request to obtain the storage information of the network device.

The sending unit 1001 is specifically configured to reply with a reply message to the controller according to the request message, where the reply message is used to notify the controller of the storage information of the network device.

Optionally, the request message is an extended multipart request message of the OpenFlow protocol, the extended multipart request message includes a type field and a request body field, the type field carries a type value indicating the storage information, and the request body field is empty or carries the device identifier.

Correspondingly, the reply message is an extended multipart reply message of the OpenFlow protocol, the multipart reply message includes the type field and a reply body field, and the reply body field carries the storage information of the network device.

Embodiment 7

An embodiment of the present invention further provides a flow entry delivering system. The system includes a controller and a network device.

The controller is configured to: obtain a device identifier of a network device and at least one flow entry that is used to perform a function on the network device; obtain storage information of the network device according to the device identifier, where the storage information includes free space in storage space of the network device that is used to store a flow entry; compare the free space with a total capacity of the at least one flow entry; and if the free space is greater than or equal to the total capacity, deliver the at least one flow entry to the network device according to the device identifier, or if the free space is less than the total capacity, skip delivering the at least one flow entry to the network device.

The network device is configured to: send storage information of the network device to a controller, where the storage information includes free space in storage space of the network device that is used to store a flow entry; receive at least one flow entry delivered by the controller, where the at least one flow entry is used to perform a function on the network device; and store the at least one flow entry in the storage space.

Embodiment 8

Figure 11:
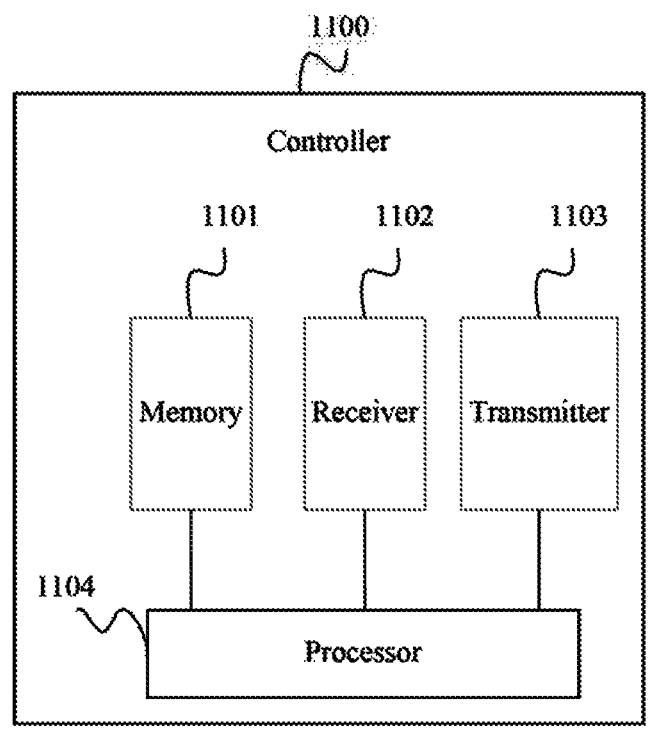
FIG. 11 is a schematic structural diagram of hardware of a controller according to an embodiment of the present invention.

Referring to FIG. 11, FIG. 11 is a schematic structural diagram of hardware of a controller according to an embodiment of the present invention. The controller 1100 includes a memory 1101, a receiver 1102, a transmitter 1103, and a processor 1104 separately connected to the memory 1101, the receiver 1102, and the transmitter 1103. The memory 1101 is configured to store a set of program instructions, and the processor 1104 is configured to invoke the program instructions stored in the memory 1101 to perform the following operations:

triggering the receiver 1102 to obtain a device identifier of a network device and at least one flow entry that is used to perform a function on the network device;

obtaining storage information of the network device according to the device identifier, where the storage information includes free space in storage space of the network device that is used to store a flow entry; and comparing the free space with a total capacity of the at least one flow entry; and if the free space is greater than or equal to the total capacity, triggering the transmitter 1103 to deliver the at least one flow entry to the network device according to the device identifier; or if the free space is less than the total capacity, skipping triggering the transmitter 1103 to deliver the at least one flow entry to the network device.

Optionally, the processor 1104 may be a central processing unit (Central Processing Unit, CPU), the memory 1101 may be an internal memory of a random access memory (Random Access Memory, RAM) type, the receiver 1102 and the transmitter 1103 may include a common physical interface, and the physical interface may be an Ethernet (Ethernet) interface or an asynchronous transfer mode (Asynchronous Transfer Mode, ATM) interface. The processor 1104, the transmitter 1103, the receiver 1102, and the memory 1101 may be integrated as one or more independent circuits or one or more pieces of independent hardware, for example, an application-specific integrated circuit (Application Specific Integrated Circuit, ASIC).

Embodiment 9

Figure 12:
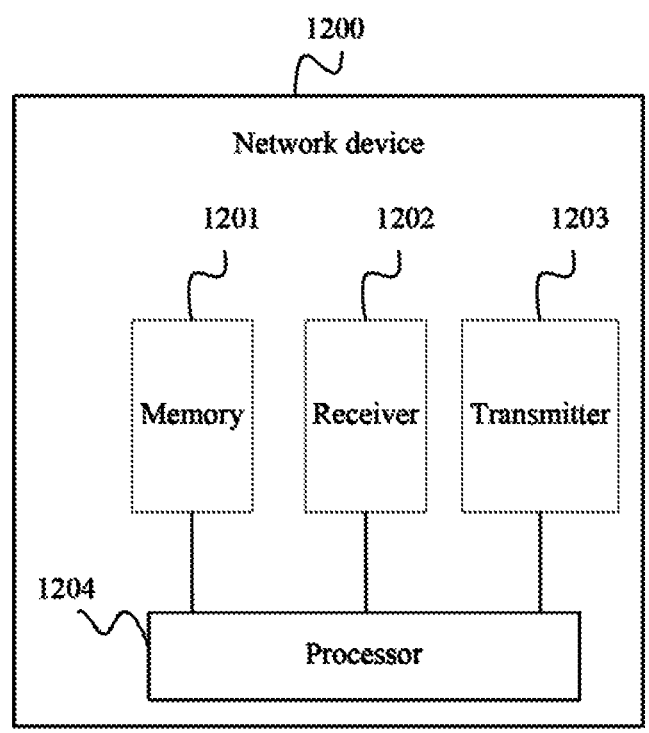
FIG. 12 is a schematic structural diagram of hardware of a network device according to an embodiment of the present invention.

Referring to FIG. 12, FIG. 12 is a schematic structural diagram of hardware of a network device according to an embodiment of the present invention. The network device 1200 includes a memory 1201, a receiver 1202, a transmitter 1203, and a processor 1204 separately connected to the memory 1201, the receiver 1202, and the transmitter 1203. The memory 1201 is configured to store a set of program instructions, and the processor 1204 is configured to invoke the program instructions stored in the memory 1201 to perform the following operations:

triggering the receiver 1202 to send storage information of the network device to a controller, where the storage information includes free space in storage space of the network device that is used to store a flow entry;

triggering the transmitter 1203 to receive at least one flow entry delivered by the controller, where the at least one flow entry is used to perform a function on the network device; and storing the at least one flow entry in the storage space.

Optionally, the processor 1204 may be a CPU, the memory 1201 may be an internal memory of a RAM type, the receiver 1202 and the transmitter 1203 may include a common physical interface, and the physical interface may be an Ethernet interface or an ATM interface. The processor 1204, the transmitter 1203, the receiver 1202, and the memory 1201 may be integrated as one or more independent circuits or one or more pieces of independent hardware, for example, an ASIC.

A person of ordinary skill in the art may understand that all or a pan of the steps of the method in the embodiments of the present invention may be implemented by a program instructing relevant hardware. The program may be stored in a computer readable storage medium. When the program runs, the steps of the method in the embodiments of the present invention are performed. The storage medium may be at least one of the following media: media that are capable of storing program code, such as a Read-Only Memory (Read-Only Memory, ROM for short), a RAM, a magnetic disk, or an optical disc.

It should be noted that the embodiments in this specification are all described in a progressive manner, for same or similar parts in the embodiments, refer to these embodiments, and each embodiment focuses on a difference from other embodiments. Especially, device and system embodiments are basically similar to method embodiments, and therefore are described briefly; for related parts, refer to partial descriptions in the method embodiment. The described device and system embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

The foregoing descriptions are merely example embodiments of the present invention, but are not intended to limit the protection scope of the present invention. It should be noted that a person of ordinary skill in the art may make certain improvements and polishing without departing from the principle of the present application and the improvements and polishing shall fall within the protection scope of the present application.

What is claimed is:

1. A flow entry delivering method, wherein the method comprises:
    obtaining, by a controller, a device identifier of a network device and at least one flow entry that is used to perform a function on the network device;
    obtaining, by the controller, storage information of the network device according to the device identifier, wherein the storage information comprises free space in storage space of the network device that is used to store a flow entry, wherein the free space in the storage space that is used to store a flow entry comprises reserved free space and non-reserved free space, the at least one flow entry further comprises a user identifier;
    determining, by the controller, that the reserved free space comprises reserved subspace corresponding to the user identifier and the reserved subspace is greater than or equal to total capacity of the at least one flow entry; and
    delivering, by the controller, the at least one flow entry to the network device according to the device identifier.

2. The method according to claim 1, wherein the obtaining, by the controller, storage information of the network device according to the device identifier comprises:
    sending, by the controller, a request message to the network device according to the device identifier, wherein the request message is used to request to obtain the storage information of the network device;
    receiving, by the controller, a reply message with which the network device replies according to the request message, wherein the reply message is used to notify the controller of the storage information of the network device; and
    obtaining, by the controller, the storage information of the network device from the reply message.

3. The method according to claim 2, wherein the request message is an extended multipart request message of the OpenFlow protocol, the extended multipart request message comprises a type field and a request body field, the type field carries a type value indicating the storage information, and the request body field is empty or carries the device identifier; and
    correspondingly, the reply message is an extended multipart reply message of the OpenFlow protocol, the multipart reply message comprises the type field and a reply body field, and the reply body field carries the storage information of the network device.

4. The method according to claim 1, further comprising:
    when the controller delivers the at least one flow entry to the network device, or receives a flow entry deletion notification sent by the network device, correspondingly updating, by the controller, the storage information, wherein the flow entry deletion notification comprises a capacity of a flow entry deleted by the network device, and a location at which the deleted flow entry is stored in the storage space before being deleted.

5. A flow entry delivering apparatus, comprising:
    a memory storage comprising computer-executable instructions; and
    a processor coupled to the memory storage, wherein the processor is configured to execute the instructions to cause the apparatus to:
    obtain a device identifier of a network device and at least one flow entry that is used to perform a function on the network device;
    obtain storage information of the network device according to the device identifier, wherein the storage information comprises free space in storage space of the network device that is used to store a flow entry, wherein the free space in the storage space that is used to store a flow entry comprises reserved free space and non-reserved free space, the at least one flow entry further comprises a corresponding user identifier;
    determine that the reserved free space comprises reserved subspace corresponding to the user identifier and the reserved subspace is greater than or equal to total capacity of the at least one flow entry; and
    deliver the at least one flow entry to the network device according to the device identifier.

6. The apparatus according to claim 5, wherein the processor is configured to execute the instructions to cause the apparatus to:
    send a request message to the network device according to the device identifier, wherein the request message is used to request to obtain the storage information of the network device;
    receive a reply message with which the network device replies according to the request message, wherein the reply message is used to notify the controller of the storage information of the network device; and obtain the storage information of the network device from the reply message.

7. The apparatus according to claim 6, wherein the request message is an extended multipart multipart request message of the OpenFlow protocol, the extended multipart request message comprises a type field and a request body field, the type field carries a type value indicating the storage information, and the request body field is empty or carries the device identifier; and correspondingly, the reply message is an extended multipart reply message of the OpenFlow protocol, the multipart reply message comprises the type field and a reply body field, and the reply body field carries the storage information of the network device.

8. The apparatus according to claim 5, wherein the processor is configured to execute the instructions to cause the apparatus to:

when the at least one flow entry is delivered to the network device, or a flow entry deletion notification sent by the network device is received, correspondingly update the storage information, wherein the flow entry deletion notification comprises a capacity of a flow entry deleted by the network device, and a location at which the deleted flow entry is stored in the storage space before being deleted.

9. A flow entry storage apparatus, comprising:

a memory storage comprising computer-executable instructions; and a processor coupled to the memory storage, wherein the processor is configured to execute the instructions to cause the apparatus to:

send storage information of the network device to a controller, wherein the storage information comprises free space in storage space of the network device that is used to store a flow entry, wherein the storage information indicates that the free space comprises reserved free space and non-reserved free space, the reserved free space comprises reserved subspace corresponding to a user identifier, and wherein the storage information further indicates size of the reserved subspace corresponding to the user identifier;

receive at least one flow entry delivered by the controller, wherein the at least one flow entry is used to perform a function on the network device, and wherein the at least one flow entry comprises the user identifier; and store the at least one flow entry in the storage space.

10. The apparatus according to claim 9, wherein the processor is configured to execute the instructions to cause the apparatus to:

before the sending unit is triggered, obtain a request message sent by the controller, wherein the request message is used to request to obtain the storage information of the network device; and the sending unit is specifically configured to reply with a reply message to the controller according to the request message, wherein the reply message is used to notify the controller of the storage information of the network device.

11. The apparatus according to claim 10, wherein the request message is an extended multipart multipart request message of the OpenFlow protocol, the extended multipart request message comprises a type field and a request body field, the type field carries a type value indicating the storage information, and the request body field is empty or carries the device identifier; and correspondingly, the reply message is an extended multipart reply message of the OpenFlow protocol, the multipart reply message comprises the type field and a reply body field, and the reply body field carries the storage information of the network device.

12. A flow entry delivering apparatus, comprising:

a memory storage comprising computer-executable instructions; and a processor coupled to the memory storage, wherein the processor is configured to execute the instructions to cause the apparatus to:

obtain a device identifier of a network device and at least one flow entry that is used to perform a function on the network device;

obtain storage information of the network device according to the device identifier, wherein the storage information comprises free space in storage space of the network device that is used to store a flow entry, wherein the free space in the storage space that is used to store a flow entry comprises reserved free space and non-reserved free space, and the at least one flow entry further comprises a corresponding user identifier;

determine that the reserved free space comprises a reserved subspace and the reserved subspace is smaller than total capacity of the at least one flow entry, and the non-reserved free space is greater than or equal to the total capacity; and deliver the at least one flow entry to the network device according to the device identifier.

13. The apparatus according to claim 12, wherein the obtain storage information of the network device according to the device identifier comprises:

send a request message to the network device according to the device identifier, wherein the request message is used to request to obtain the storage information of the network device;

receive a reply message with which the network device replies according to the request message, wherein the reply message is used to notify the controller of the storage information of the network device; and obtain the storage information of the network device from the reply message.

14. The apparatus according to claim 13, wherein the request message is an extended multipart request message of the OpenFlow protocol, the extended multipart request message comprises a type field and a request body field, the type field carries a type value indicating the storage information, and the request body field is empty or carries the device identifier; and correspondingly, the reply message is an extended multipart reply message of the OpenFlow protocol, the multipart reply message comprises the type field and a reply body field, and the reply body field carries the storage information of the network device.

15. The apparatus according to claim 12, further comprising:

when the controller delivers the at least one flow entry to the network device, or receives a flow entry deletion notification sent by the network device, correspondingly update the storage information, wherein the flow entry deletion notification comprises a capacity of a flow entry deleted by the network device, and a location at which the deleted flow entry is stored in the storage space before being deleted.

* * * * *